US012592034B2

(12) United States Patent
Shang et al.

(10) Patent No.: US 12,592,034 B2
(45) Date of Patent: Mar. 31, 2026

(54) METHOD AND SYSTEM FOR THREE-DIMENSIONAL RECONSTRUCTION, AND STORAGE MEDIUM

(71) Applicant: Sony Group Corporation, Tokyo (JP)

(72) Inventors: Hong Shang, Beijing (CN); Xiang Li, Beijing (CN); Zhan Shi, Beijing (CN); Kuanhong Xu, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 128 days.

(21) Appl. No.: 18/701,619

(22) PCT Filed: Nov. 8, 2022

(86) PCT No.: PCT/CN2022/130480
§ 371 (c)(1),
(2) Date: Apr. 16, 2024

(87) PCT Pub. No.: WO2023/083154
PCT Pub. Date: May 19, 2023

(65) Prior Publication Data
US 2024/0420416 A1 Dec. 19, 2024

(30) Foreign Application Priority Data
Nov. 10, 2021 (CN) .......................... 202111324566.6

(51) Int. Cl.
*G06T 17/00* (2006.01)
*G06T 5/50* (2006.01)
(Continued)

(52) U.S. Cl.
CPC ................ *G06T 17/00* (2013.01); *G06T 5/50* (2013.01); *G06T 7/60* (2013.01); *G06T 7/80* (2017.01);
(Continued)

(58) Field of Classification Search
CPC . G06T 17/00; G06T 2207/20221; G06T 5/50; G06T 7/514; G06T 7/55;
(Continued)

(56) References Cited

U.S. PATENT DOCUMENTS 9,230,325 B2 1/2016 Hu et al.
10,867,430 B2 12/2020 Lucas et al.
(Continued)

FOREIGN PATENT DOCUMENTS

CN 101923730 B 5/2012
CN 104182095 A 12/2014
(Continued)

OTHER PUBLICATIONS

International Search Report and Written Opinion mailed on Feb. 7, 2023, received for PCT Application PCT/CN2022/130480, filed on Nov. 8, 2022, 8 pages including English Translation.
(Continued)

*Primary Examiner* — Sing-Wai Wu

(74) *Attorney, Agent, or Firm* — XSENSUS LLP

(57) ABSTRACT

The present disclosure relates to a method and system for three-dimensional reconstruction, and a storage medium. Embodiments regarding three-dimensional reconstruction are described. In an embodiment, the method for three-dimensional reconstruction comprises: obtaining a composite image obtained by photographing a body of a target object and a mirror image of the target object; and performing three-dimensional reconstruction on the target object by using the composite image and relative position and posture
(Continued)

308

402: Performing random sampling on points within a given three-dimensional space comprising the target object

404: Extracting a global feature corresponding to a sampling point from the composite image

406: Performing encoding on imaging-related geometric information of the sampling point, to generate geometric encoded information

408: Inputting the global feature and the geometric encoded information into a model, to determine a geometric relationship between the sampling point and a surface of the target object

410: Training the model information representing a position and posture of a mirror for generating the mirror image relative to a camera for the photography.

11 Claims, 6 Drawing Sheets

(51) Int. Cl.

| | | |
|---|---|---|
| *G06T 7/60* | (2017.01) | |
| *G06T 7/80* | (2017.01) | |
| *G06T 9/00* | (2006.01) | |
| *G06V 10/44* | (2022.01) | |
| *G06V 10/771* | (2022.01) | |

(52) U.S. Cl.

CPC ................ *G06T 9/00* (2013.01); *G06V 10/44* (2022.01); *G06V 10/771* (2022.01); *G06T 2207/20221* (2013.01)

(58) Field of Classification Search

CPC .... G06T 7/60; G06T 7/80; G06T 9/00; G06T 2200/08; G06V 10/44; G06V 10/771; G06N 3/08; G06N 3/045; G06F 17/16

See application file for complete search history.

(56) References Cited

U.S. PATENT DOCUMENTS

| | | | |
|---|---|---|---|
| 2003/0001837 A1* | 1/2003 | Baumberg ............. | G06T 15/20 |
| | | | 345/419 |
| 2003/0144813 A1* | 7/2003 | Takemoto ................ | G06T 7/80 |
| | | | 702/153 |
| 2013/0044190 A1* | 2/2013 | Hu ........................... | G06T 7/80 |
| | | | 348/E13.074 |

FOREIGN PATENT DOCUMENTS

| | | |
|---|---|---|
| CN | 104567818 A | 4/2015 |
| CN | 103971404 B | 4/2017 |
| CN | 107633550 A | 1/2018 |
| CN | 110443888 B | 3/2021 |
| EP | 2533199 B1 | 8/2014 |
| WO | 2019/200419 A2 | 10/2019 |

OTHER PUBLICATIONS

Saito et al., "PIFu: Pixel-Aligned Implicit Function for High-Resolution Clothed Human Digitization", arXiv:1905.05172v3, Dec. 3, 2019, pp. 1-15.

* cited by examiner

<u>100</u>

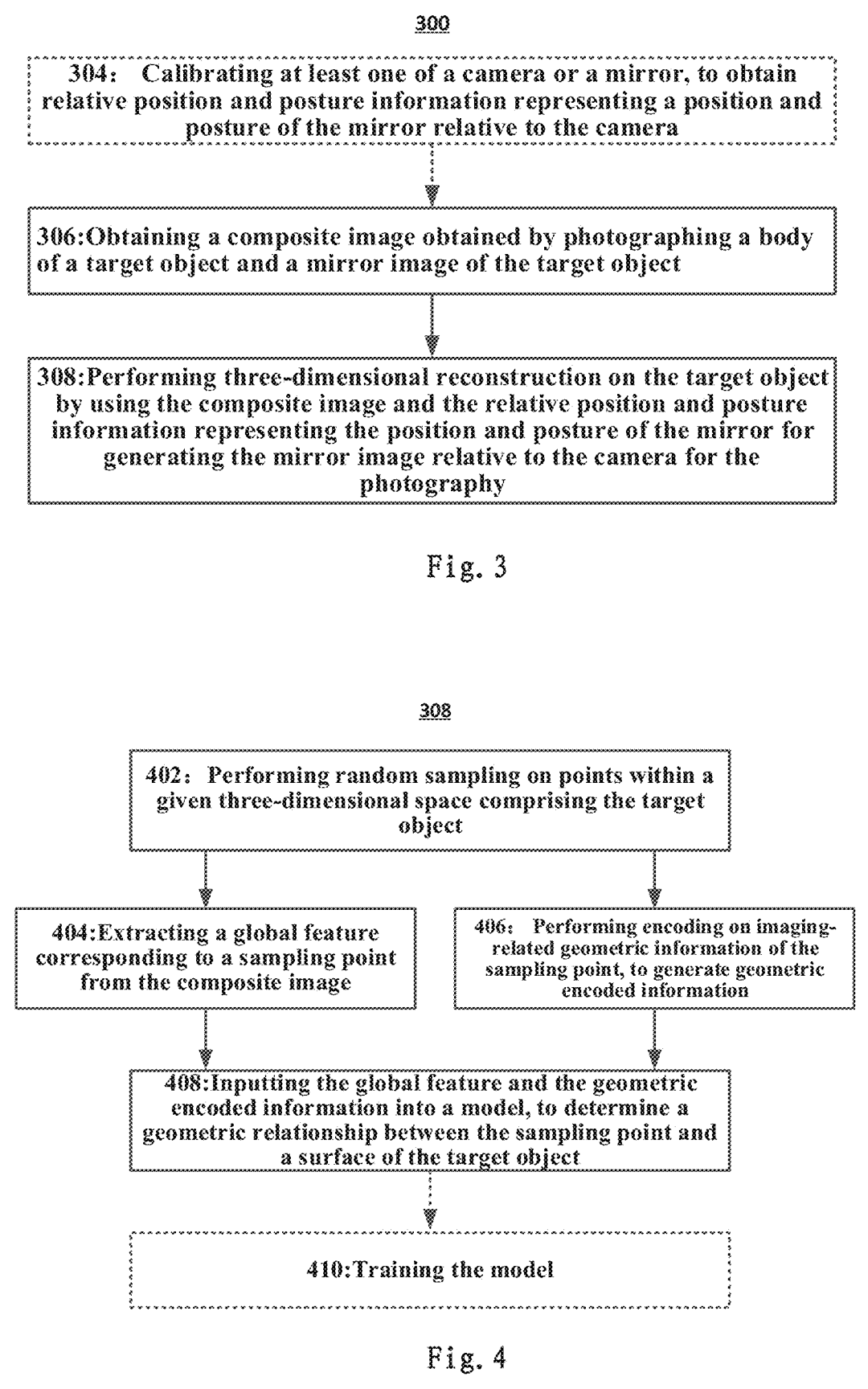

300

304: Calibrating at least one of a camera or a mirror, to obtain relative position and posture information representing a position and posture of the mirror relative to the camera 306:Obtaining a composite image obtained by photographing a body of a target object and a mirror image of the target object 308:Performing three-dimensional reconstruction on the target object by using the composite image and the relative position and posture information representing the position and posture of the mirror for generating the mirror image relative to the camera for the photography

402: Performing random sampling on points within a given three-dimensional space comprising the target object 404:Extracting a global feature corresponding to a sampling point from the composite image 406: Performing encoding on imaging-related geometric information of the sampling point, to generate geometric encoded information 408:Inputting the global feature and the geometric encoded information into a model, to determine a geometric relationship between the sampling point and a surface of the target object 410:Training the model

Fig. 4

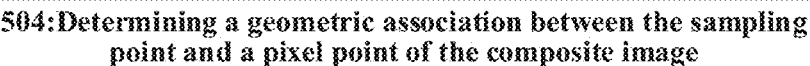

404

502:  Performing feature extraction on the composite image, to obtain a global feature map 504:Determining a geometric association between the sampling point and a pixel point of the composite image 510:  Determining a geometric association between the sampling point and a body pixel point in the composite image, which is obtained by photographing the body of the target object 520:  Determining, according to the relative position and posture information, a geometric association between the sampling point and a mirror image pixel point in the composite image, which is obtained by photographing the mirror image of the target object, 506:Determining a global feature corresponding to the sampling point from the global feature map based on the geometric association

Fig. 5A

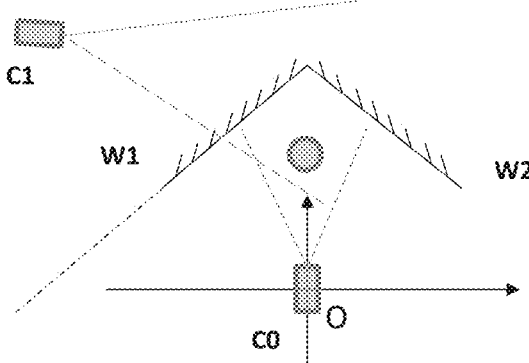

Fig. 5B

Body camera projection matrix

Mirror virtual camera projection matrix

Mirror virtual camera projection matrix

Body camera

Mirror virtual camera 1

Mirror virtual Camera 2

Mirror virtual camera L

7

Memory    71

Processor    72

METHOD AND SYSTEM FOR THREE-DIMENSIONAL RECONSTRUCTION, AND STORAGE MEDIUM

CROSS-REFERENCE TO RELATED APPLICATIONS

The present application is based on PCT filing PCT/CN2022/130480, filed on Nov. 8, 2022, which claims the priority to the Chinese Patent Application No. 202111324566.6 filed on Nov. 10, 2021, the disclosure of each are incorporated herein in its entirety.

TECHNICAL FIELD

The present disclosure relates generally to three-dimensional reconstruction technology, and specifically to three-dimensional reconstruction technology based on deep neural networks.

BACKGROUND

High-precision three-dimensional reconstruction can play an important role in occasions such as industrial automation, medical assistance applications, virtual reality applications, visual navigation and the like which are difficult or even impossible to handle by plane visions.

Traditional high-precision three-dimensional reconstruction technology needs to obtain image information or depth information of a target object at a plurality of angles of view, and in general, the precision of the three-dimensional reconstruction is directly related to density of the angles. The sparser the angles, the lower the precision of the three-dimensional reconstruction, and even modeling becomes impossible.

SUMMARY

One aspect of the present disclosure relates to a method for three-dimensional reconstruction. According to an embodiment of the present disclosure, a method for three-dimensional reconstruction comprises: obtaining a composite image obtained by photographing a body of a target object and a mirror image of the target object; and performing three-dimensional reconstruction on the target object by using the composite image and relative position and posture information representing a position and posture of a mirror for generating the mirror image relative to a camera for the photography.

One aspect of the present disclosure relates to a system for three-dimensional reconstruction. According to an embodiment of the present disclosure, a system for three-dimensional reconstruction comprises: an information processing apparatus configured to perform the steps of the methods according to the embodiments of the present disclosure.

One aspect of the present disclosure relates to a plane mirror group comprising one or more plane mirror units. According to an embodiment of the present disclosure, the plane mirror group comprises a position and posture obtaining module disposed thereon and configured to obtain and send information related to a position and posture of the plane mirror group.

Yet another aspect of the present disclosure relates to an electronic device, comprising: a memory and a processor coupled to the memory, the processor being configured to perform, based on instructions stored in the memory, the method for three-dimensional reconstruction according to the embodiment of the present disclosure.

Yet another aspect of the present disclosure relates to a non-transitory computer-readable storage medium having one or more instructions stored thereon, which, when executed by a processor, cause the processor to perform the method for three-dimensional reconstruction according to the embodiment of the present disclosure.

Yet another aspect of the present disclosure relates to a computer program product, comprising one or more instructions, which, when executed by a processor, cause the processor to perform the method for three-dimensional reconstruction according to the embodiment of the present disclosure.

The above summary is provided to summarize some exemplary embodiments to provide a basic understanding of aspects of the subject matter described herein. Therefore, the above features are merely examples and should not be construed to narrow the scope or spirit of the subject matter described herein in any way. Other features, aspects, and advantages of the subject matter described herein will become apparent from the following specific implementations that is described in conjunction with the accompanying drawings.

BRIEF DESCRIPTION OF THE DRAWINGS

A better understanding of the present disclosure may be obtained when the following specific description of the embodiments is considered in conjunction with the accompanying drawings. Identical or similar reference numbers are used in the drawings to represent identical or similar components. The accompanying drawings, together with the specific description below, are incorporated in and form a part of the specification to illustrate the embodiments of the present disclosure and explain the principles and advantages of the present disclosure. In the drawings:

FIG. 3 is a flowchart illustrating an example of steps of a method for three-dimensional reconstruction according to an embodiment of the present disclosure.

FIG. 4 is a flowchart illustrating an example of sub-steps of part of steps of a method for three-dimensional reconstruction according to an embodiment of the present disclosure.

FIG. 5A is a flowchart illustrating an example of steps of extracting a global feature according to an embodiment of the present disclosure.

FIG. 5B is a flowchart illustrating an example of steps of establishing a geometric association according to an embodiment of the present disclosure.

Figure 1:
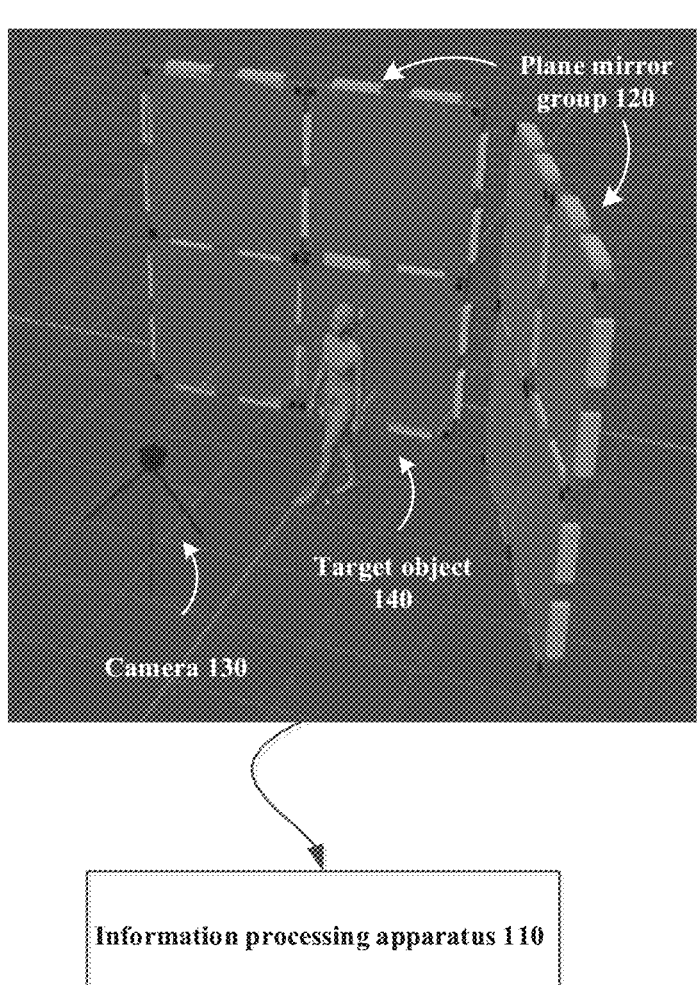
FIG. 1 is a schematic diagram illustrating an example of configuration of a system for three-dimensional reconstruction according to an embodiment of the present disclosure.

While the embodiments described in the disclosure might easily have various modifications and alternative forms, specific embodiments thereof have been illustrated as examples in the drawings and have been described in detail herein. However, it should be understood that the drawings and detailed description thereto are not intended to limit the embodiments to the specific form disclosed, but rather to cover all modifications, equivalents and alternatives falling within the spirit and scope of the claims.

DETAILED DESCRIPTION

Representative applications in various aspects such as the device and method according to the present disclosure are described below. The description of these examples is merely to add context and help understanding the described embodiments. Therefore, it is apparent to those skilled in the art that the embodiments described below may be implemented without some or all of the specific details. In other cases, well known process steps are not described in detail to avoid unnecessarily obscuring the described embodiments. Other applications are also possible, and the solutions of the present disclosure are not limited to these examples.

An example of configuration of a system for three-dimensional reconstruction according to an embodiment of the present disclosure is exemplarily described below in conjunction with FIG. 1.

According to the embodiment of the present disclosure, the system 100 for three-dimensional reconstruction may include an information processing apparatus 110.

The information processing apparatus 110 is used for performing three-dimensional reconstruction. In particular, the information processing apparatus 110 may be configured to perform at least part of steps of a method for three-dimensional reconstruction, which will be described later.

In some embodiments, the system 100 for three-dimensional reconstruction may further include a plane mirror group 120. Specifically, each plane mirror group 120 may provide one mirror. The number L of the plane mirror group 120 in the system 100 can be selected as needed. L is a positive integer.

According to the mirror imaging principle, the mirror of the plane mirror group 120 may generate a mirror image of a target object 140. The applicants have realized that, like a body of the target object, the mirror image of the target object in the mirror may also include feature information of the target object at a specific angle of view. Therefore, it is proposed in the present disclosure that, images at a plurality of angles of view that are required for three-dimensional reconstruction of the target object are provided using the configuration of one or more cameras in combination with a plane mirror group, so as to reduce the requirement and the dependence on the number of the cameras.

In some embodiments, the plane mirror group 120 may be formed by one or more plane mirror units. For example, more than one plane mirror units may be spliced together, placed adjacent to each other, or placed in cells in a shape of for example a Chinese character "田", a Chinese character "井", or a honeycomb, etc.

Figure 2A:
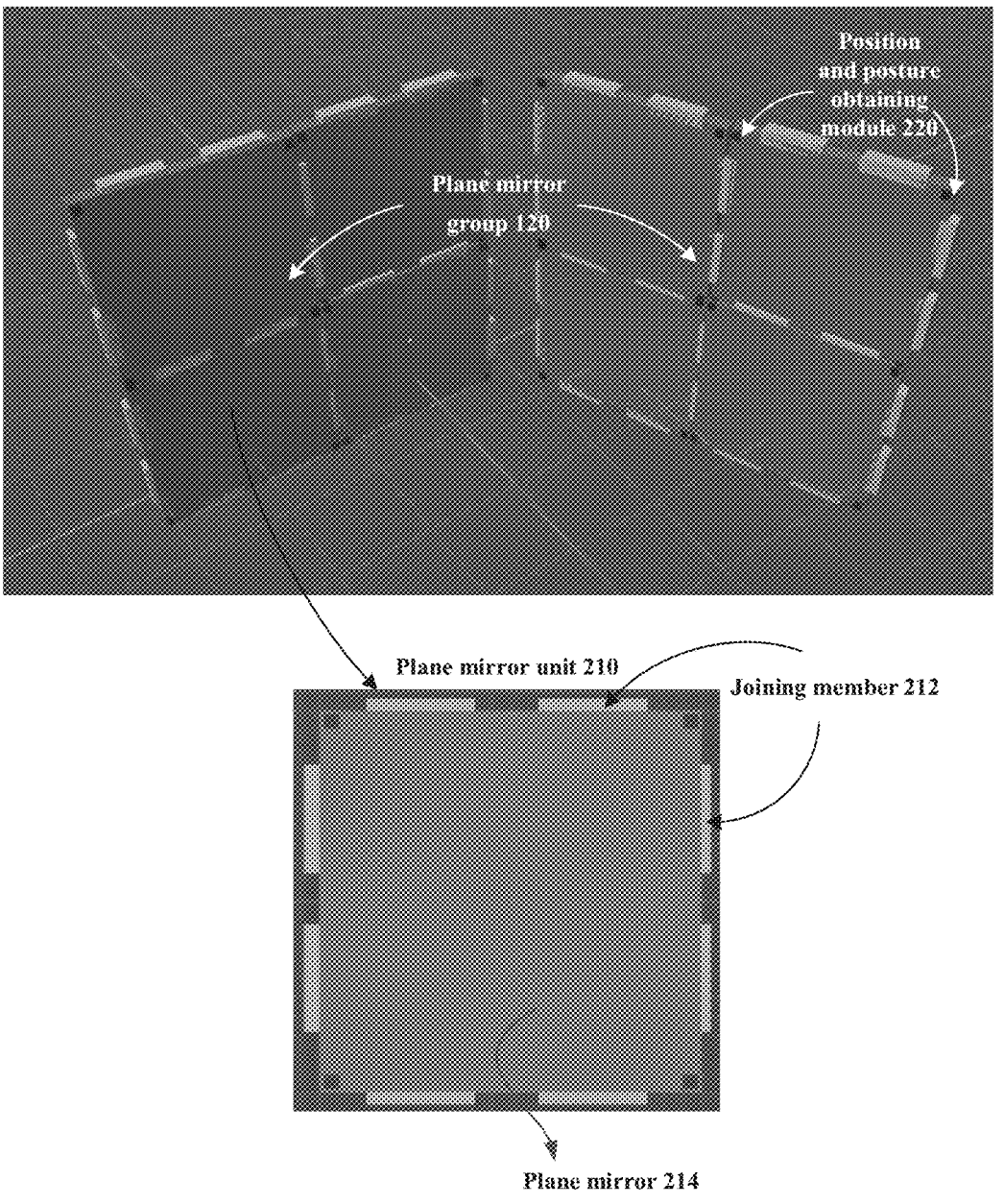
FIG. 2A is a schematic diagram illustrating an example of configuration of a plane mirror group and a plane mirror unit according to an embodiment of the present disclosure.

FIG. 2A schematically illustrates an example of configuration of a plane mirror group according to an embodiment of the present disclosure, wherein an example of configuration of a plane mirror unit forming the plane mirror group is schematically illustrated in a partial enlarged view.

As shown in the figure, in some embodiments, each plane mirror group 120 may include one or more plane mirror units 210. The plane mirror unit 210 may include a plane mirror 214, and the plane mirrors in all the plane mirror units included in any plane mirror group may jointly form the mirror of the plane mirror group.

As shown in the figure, in some embodiments, the plane mirror unit 210 may be spliced by a joining member 212. For example, the joining member 212 according to some embodiments may be disposed at four sides of the plane mirror unit 210, as shown in FIG. 2A. With this arrangement, the plane mirror unit 210 can be extended arbitrarily in four directions as needed, and the imaging of the plane mirror group is almost unaffected. It should be understood by those skilled in the art that there are no particular limitations on the arrangement position and the joining manner of the joining member 212, but they may be selected according to an actual application as long as the joining member 212 can splice the plane mirror units into a plane mirror group to provide a larger mirror and reduce the influence on the mirror imaging.

Advantageously, by using spliceable plane mirror units to provide the plane mirror group, the plane mirror group is enabled to be detachable, easily extendable, and flexibly adaptable to different needs.

In particular, in some embodiments, at least part of the following may be adjusted as needed: the number of the plane mirror groups, and a position or posture of at least part of the plane mirror groups relative to the camera.

Figure 2B:
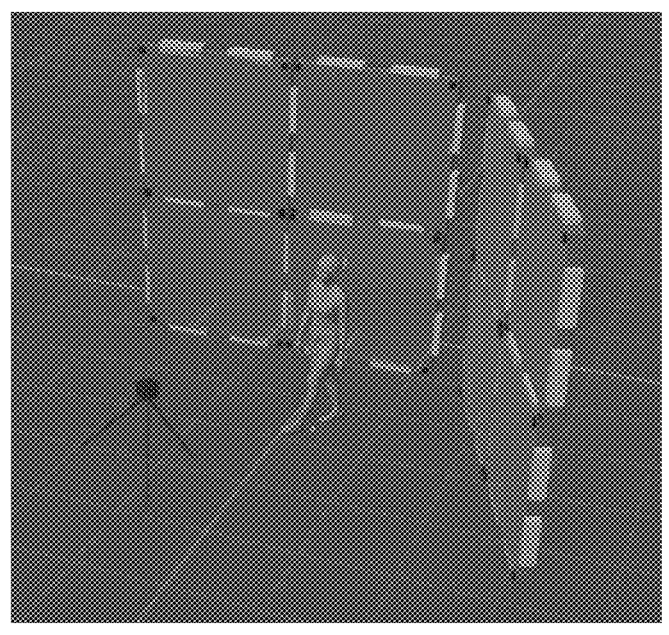
FIG. 2B illustrates a schematic diagram of an example of an arrangement of a plane mirror group according to an embodiment of the present disclosure.
Figure 2C:
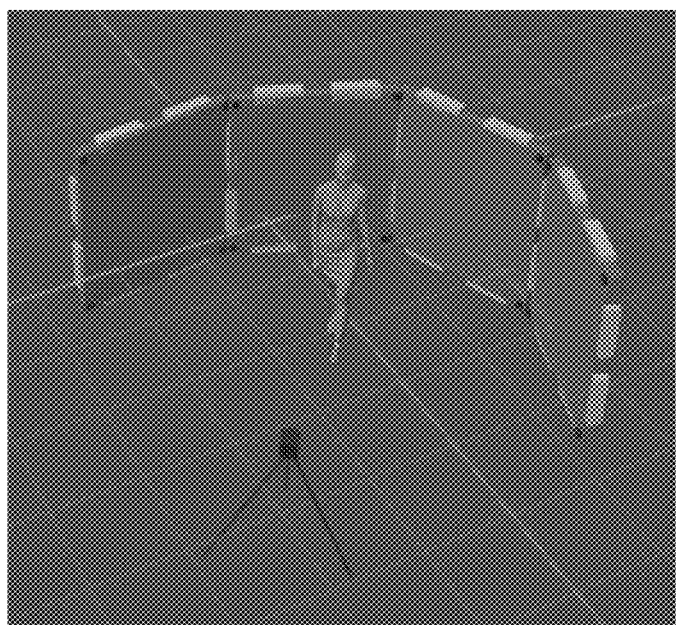
FIG. 2C illustrates a schematic diagram of another example of an arrangement of a plane mirror group according to an embodiment of the present disclosure.

Adjustment of the arrangement of the plane mirror group is described below in conjunction with examples of arrangements of plane mirror groups according to embodiments of the present disclosure shown in FIG. 2B and FIG. 2C, respectively. In the example of the arrangement shown in FIG. 2B, two plane mirror groups are used, which perform mirror imaging on the target object in two different positions and postures, wherein each plane mirror group is formed by splicing four plane mirror units so that the plane mirror group has a relatively large size. After adjustment, in the example of the arrangement shown in FIG. 2C, four plane mirror groups are used, which perform mirror imaging on the target object in four different positions and postures, wherein each plane mirror group includes only one plane mirror unit, so that the plane mirror group has a relatively small size. It should be understood by those skilled in the art that there are no particular limitations on the arrangement of the plane mirror group, but it can be designed and adjusted according to an actual application.

In some embodiments, the system 100 may further include a positioning apparatus (not shown) for performing at least part of the arrangement of the plane mirror group 120 described above and an arrangement of a camera 130 that will be described later. For example, the positioning apparatus may be configured to adjust a position or posture of one or more plane mirror groups relative to the camera. In some embodiments, the positioning apparatus may be implemented by using, for example, a robotic arm.

In some embodiments, the positioning apparatus may obtain information related to the arrangement from the information processing apparatus 110, and control the arrangements of the plane mirror group and the camera based on the information. The information related to the arrangement may be generated, for example, by one or more of the following: designing for an application scenario, selecting or presetting according to experience, or the like.

Alternatively, in some embodiments, at least part of the arrangements of the plane mirror group and the camera may be performed manually by an operator.

It should be understood by those skilled in the art that although the drawings illustrate the case where one or more plane mirror units are spliced to form a plane mirror group, the present application is not limited thereto. For example, in some embodiments, the plane mirror group may be implemented using a single plane mirror.

In some embodiments of the present disclosure, the plane mirror group 120 includes a position and posture obtaining module 220 disposed thereon.

In some embodiments, the position and posture obtaining module 220 may be configured to obtain and send information related to a position and posture of the plane mirror group. For example, the position and posture obtaining module 220 may send the information related to the position and posture of the plane mirror group to the information processing apparatus 110. The information related to the position and posture of the plane mirror group (position and posture-related information of the plane mirror group) may directly or indirectly indicate the position and posture of the plane mirror group. In some embodiments, the position and posture obtaining module 220 may include a sensing element (not shown) for sensing a position and posture-related parameter, thereby obtaining the position and posture-related information of the plane mirror group. The position and posture obtaining module 220 may further include a communication element (not shown) for communication, thereby sending the position and posture-related information of the plane mirror group. The position and posture obtaining module 220 may actively report the position and posture-related information of the plane mirror group. Alternatively, the position and posture obtaining module 220 may respond with the position and posture-related information of the plane mirror group upon receiving a query.

In these embodiments, the position and posture obtaining module 220 may be disposed at an edge or on a back side of the plane mirror group to reduce the influence on the mirror imaging.

In some other embodiments, the position and posture obtaining module 220 may be configured to calibrate position and posture information of the plane mirror group using a specific pattern. For example, the position and posture obtaining module 220 may be configured to provide, on the plane mirror group, specific patterns containing marker features, such as a bar code, a QR code, or a checkerboard. Once these specific patterns are photographed, the position and posture of the plane mirror group relative to the camera, i.e., the relative position and posture information, can be recognized.

In these embodiments, the position and posture obtaining module 220 may be disposed at edges (especially four corners) of the plane mirror units forming the plane mirror group, to form a suitable pattern and reduce the influence on the mirror imaging.

Alternatively, in some embodiments, the position and posture information of the plane mirror group 120 may be predetermined.

In some embodiments, the system 100 for three-dimensional reconstruction may further include a camera 130. The camera 130 may be configured to photograph a body and a mirror image of the target object 140, thereby obtaining a composite image. The composite image described in this application refers to an image that is captured by the camera 130 and contains both the body and at least part of the mirror image of the target object. As shown in FIG. 1, the information from the camera 130 may be sent to the information processing apparatus 110.

The camera 130 may include a position and posture obtaining module (not shown). For example, by combining the information sent by the respective position and posture obtaining modules of the camera 130 and the plane mirror group 120, the position and posture of the plane mirror group 120 relative to the camera 130, i.e., the relative position and posture information, may be determined. Alternatively, the camera 130 may be pre-calibrated.

In some embodiments, the information processing apparatus 110 may be deployed near the camera 130 (the plane mirror group 120). Alternatively, in some embodiments, at least part of the information processing apparatus 110 may be deployed separately from the camera 130. For example, in some embodiments, at least part of the information processing apparatus 110 may be deployed at a remote server. Alternatively, in some embodiments, the information processing apparatus 110 may also be integrated with the camera or the positioning apparatus into a same device or module. It should be understood by those skilled in the art that there are no particular limitations on a position relation between the information processing apparatus 110 and the camera 130, and it may be selected according to an actual application as long as the information processing apparatus 110 can obtain information to be processed.

Although the system 100 illustrated in FIG. 1 includes the plane mirror group 120 and the camera 130, it should be understood by those skilled in the art that the system 100 itself may not include the plane mirror group 120 and/or the camera 130, but may instead use a plane mirror group 120 and/or camera 130 external to the system. For example, the system 100 may directly use a composite image photographed by a camera external to the system.

A method for three-dimensional reconstruction according to an embodiment of the present disclosure is exemplarily described below with reference to FIGS. 3, 4, 5A-5B, and 6. The method is applicable to any electronic device with a processing capability. What has been described above in conjunction with FIGS. 1, 2A-2C may also be applied to corresponding features. For example, all or any part of the features of the plane mirror group described above may also be applied to the method for three-dimensional reconstruction described below or to the system for performing the method.

As shown in FIG. 3, according to the embodiment of the present disclosure, the method 300 for three-dimensional reconstruction may mainly include the following steps:

step 306 of, obtaining a composite image obtained by photographing a body of a target object and a mirror image of the target object; and step 308 of, performing three-dimensional reconstruction on the target object by using the composite image and relative position and posture information representing a position and posture of a mirror for generating the mirror image relative to a camera for the photography.

In some embodiments, the method for three-dimensional reconstruction may further comprise arranging at least part of the camera and the plane mirror group providing a mirror, such that a photography range of the camera covers the target object as well as the mirror. Here, "arrangement" may refer to "installation", "replacement", "adjustment", and the like. The basic requirement of "arrangement" is to make the photography range of the camera cover the target object and at least part of the mirror, thereby enabling the camera to photograph the body of the target object and at least part of the mirror image of the target object in the mirror.

In some embodiments, the arranging at least part of the camera and the plane mirror group may include sending an instruction, and controlling the arrangement of the plane mirror group and the camera based on information related to the arrangement that is included in the instruction. For example, the positioning apparatus may be controlled to adjust a position or posture of one or more plane mirror groups relative to the camera. The positioning apparatus may be implemented by using, for example, a robotic arm.

In some embodiments, the information related to the arrangement may be generated by one or more of the following: designing for an application scenario, selecting or presetting according to experience, or the like.

Alternatively, in some embodiments, before the method for three-dimensional reconstruction is performed, at least part of the camera and the plane mirror group is arranged manually by an operator.

In some embodiments, the arranging at least part of the camera and the plane mirror group may comprise adjusting at least one of the following as needed: the number of the plane mirror group, the position or posture of at least part of the plane mirror group relative to the camera, or the like. The example of this adjustment has been described above in conjunction with FIGS. 2B-2C so that it will not be repeated here. By arranging the camera and the plane mirror group accordingly according to the application requirement and the scenario feature, at least one of improving performance or reducing cost can be advantageously achieved.

Alternatively, in some embodiments, the camera and the plane mirror group are preset in place, and therefore the arrangement is unnecessary. For example, in a certain application scenario, the camera and the plane mirror group might have already been installed and adjusted in advance. In this case, the three-dimensional reconstruction on the target object can be directly performed without the arrangement of the camera and the plane mirror group.

In some embodiments, the method for three-dimensional reconstruction may further include calibrating at least one of the camera or the mirror, to obtain the relative position and posture information indicating the position and posture of the mirror relative to the camera (step 304).

For example, in some embodiments, the position and posture of the mirror relative to the camera, i.e., the relative position and posture information, may be determined in conjunction with the information sent by respective position and posture obtaining modules of the camera and the plane mirror group providing the mirror. Alternatively, in some embodiments, specific patterns containing marker features, such as a bar code, a QR code, or a checkerboard, may be arranged on the plane mirror group. By photographing these specific patterns using the camera, the relative position and posture information can be recognized. Still alternatively, in some embodiments, one of the camera and the mirror is pre-calibrated, and the relative position and posture information can be obtained only using a position and posture obtaining module on the other of the camera and the mirror.

Alternatively, in some embodiments, the relative position and posture between the camera and the mirror are preset and known, and therefore the step 304 is unnecessary. For example, in a certain application scenario, once the camera and the mirror are installed, the three-dimensional reconstruction may be performed many times without changing the arrangement of the two. In this case, it is not needed to re-obtain the relative position and posture information in each three-dimensional reconstruction.

However, if the relative position and posture between the camera and the mirror are changed by an arrangement, re-calibration is required.

In step 306, a composite image obtained by photographing a body of a target object and a mirror image of the target object is obtained.

Figure 6:
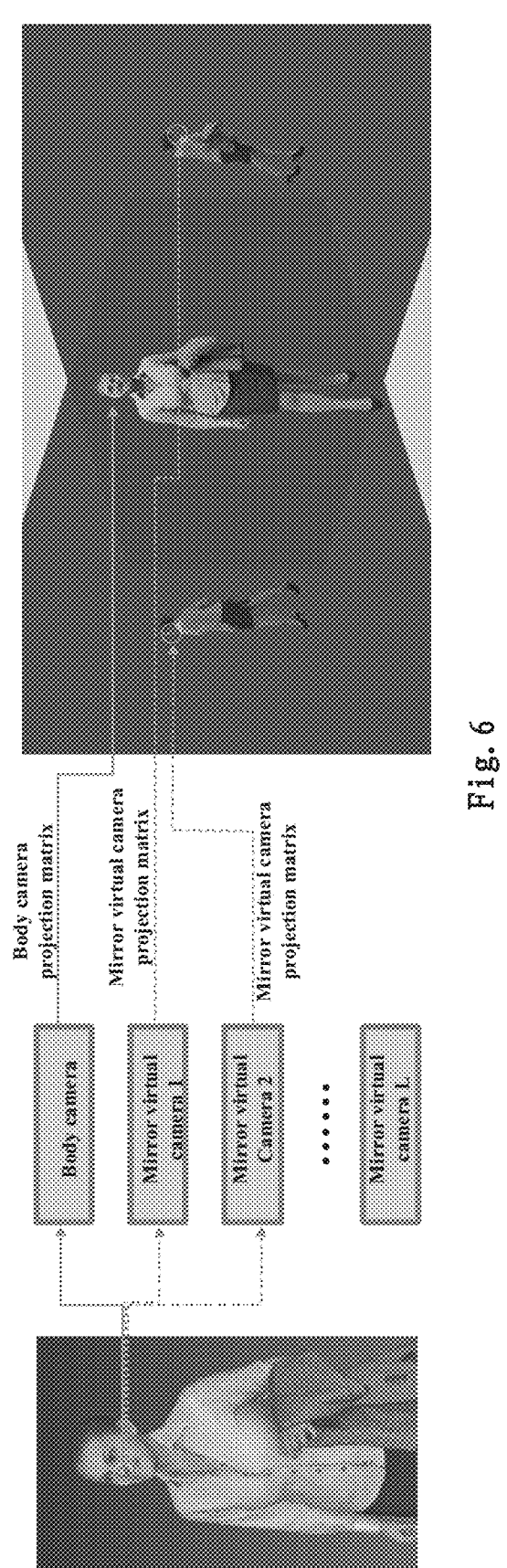
FIG. 6 is a schematic diagram illustrating an example of obtaining a composite image according to an embodiment of the present disclosure.

In the prior art, in order to perform 3D reconstruction on a target object, a plurality of cameras are required to capture images from a plurality of angles of view. As mentioned above, a mirror image of the target object is equivalent to an image of the target object "photographed" at one or even several specific angles of view, that is, equivalently, each mirror replaces one or more cameras in the prior art (hereinafter referred to as mirror virtual cameras). By appropriately arranging the camera and the mirror, as shown in FIG. 6, the body of the target object and the mirror image of the target object in the mirror can be photographed onto a same image (referred to as the composite image herein). Therefore, image information at a plurality of angles of view that is required for the three-dimensional reconstruction of the target object can be obtained using the composite image.

In the related three-dimensional reconstruction technology, precision of three-dimensional modeling is directly related to the number of the cameras, and therefore the use of a plurality of cameras is generally needed to obtain images at a plurality of angles of view. In this application, three-dimensional modeling is performed by using the composite image obtained by photographing the body of the target object and the mirror image of the target object, which can reduce the requirement and dependence on the number of cameras and achieve high-precision processing with lower cost.

In step 308, three-dimensional reconstruction is performed by using the composite image and relative position and posture information representing the position and posture of the mirror relative to the camera.

An example of sub-steps of performing three-dimensional reconstruction (step 308) according to an embodiment of the present disclosure is described in detail below in conjunction with FIG. 4.

As illustrated in FIG. 4, random sampling may be performed on points within a given three-dimensional space including the target object (step 402).

In some embodiments, the given three-dimensional space including the target object may be suitably constrained to improve the efficiency of the sampling. In addition, the number N of the sampling points can be selected as needed. N is a positive integer.

Subsequently, a global feature corresponding to the sampling point may be extracted from the composite image (step 404).

FIG. 5 illustrates in detail an example of specific steps of extracting the global feature corresponding to the sampling point from the composite image according to an embodiment of the present disclosure.

As illustrated in FIG. 5, in step 502, feature extraction is performed on the composite image, to obtain a global feature map.

Specifically, in some embodiments, the composite image may be inputted into a feature extractor for the feature extraction.

In some embodiments, the feature extractor may include, but is not limited to, any one or combination of a neural network, automatic codec, SIFT, HOG, or the like.

As an output of the feature extractor, the global feature map for the composite image may be obtained.

In some embodiments, the global feature map may be formed by feature elements. Each feature element may be represented in a form of a multi-dimensional vector. The feature elements in the global feature map may correspond to pixel points on the image, respectively. Here, "correspondence" between a feature element and a pixel point refers to that the feature element can represent a feature of the corresponding pixel point. Those skilled in the art would readily appreciate that, the higher the resolution or the smaller the pixel point of an image, the more accurately the extracted global feature map can represent the image, but the greater the corresponding workload.

In some embodiments, to avoid significant computational overhead, performing global feature extraction on the image further includes, before inputting the image to the feature extractor, pre-processing, such as down-sampling, the image, to reduce the resolution of the image. For example, in some embodiments, an image with a resolution of 512*512 may be compressed into an image with a resolution of 64*64 before the image is inputted to a feature extractor.

In step 504, a geometric association between the sampling point and a pixel point of the composite image is determined. Therefore, a correspondence between a world coordinate system and an image coordinate system can be determined.

The pixel points in the composite image which correspond to the sampling points may include not only a pixel point obtained by photographing the body of the target object (hereinafter referred to as a body pixel point), but also a pixel point obtained by photographing the mirror image of the target object (hereinafter referred to as a mirror image pixel point). Therefore, establishing the geometric association between the sampling point and the pixel point of the composite image may specifically comprise: determining a geometric association between the sampling point and the body pixel point (sub-step 510), and determining a geometric association between the sampling point and the mirror image pixel point (sub-step 520).

In some embodiments, the geometric association between the sampling points and pixel points of the composite image may be determined by calculating a projection matrix of a body camera (real camera) and a projection matrix of a mirror virtual camera (mirror-provided virtual camera). The body camera projection matrix and the mirror virtual camera projection matrix may be calculated using the relative position and posture information known to the system or obtained by the step 304.

An example of the determination method of the projection matrix is explained below in conjunction with FIG. 5B.

For ease of calculation and description, a position of a camera $C_0$ may be set as an origin O of a world coordinate system. By using the relative position and posture information, a normal vector $n=(n_x, n_y, n_z)$ of a plane mirror group $W_1$ and a distance d from a plane where the plane mirror group $W_1$ is located to the camera $C_0$ may be obtained.

A position of a mirror image of the camera $C_0$ with respect to the plane mirror group $W_1$ may be represented as:

$$T_1 = 2((T_0 \cdot n)n + dn)$$ [Equation 1]

where $T_0$ represents the position of the camera $C_0$ in the world coordinate system. Since the camera $C_0$ is assumed to be located at the origin O of the world coordinate system, the above equation may be further simplified as $T_1 = 2dn$. In conjunction with the above analysis, it can be concluded that the position $T_1$ of the mirror image is a position of a mirror virtual camera $C_1$ defined in this disclosure.

An posture rotation matrix $R_1$ of the mirror virtual camera $C_1$ may be represented as:

$$R_1 =$$ [Equation 2]

$$R_0 V R_0^T = R_0 \begin{pmatrix} -n_x^2 + n_y^2 + n_z^2 & -2n_x n_y & -2n_x n_z \\ -2n_x n_y & n_x^2 - n_y^2 + n_z^2 & -2n_y n_z \\ -2n_x n_z & -2n_x n_z & n_x^2 + n_y^2 - n_z^2 \end{pmatrix} R_0^T$$

where V is a mirror image matrix, and $R_0$ is a posture rotation matrix of the camera $C_0$. In this example, $R_0$ may be represented as:

$$R_0 = \begin{pmatrix} 1 & 0 & 0 \\ 0 & 1 & 0 \\ 0 & 0 & 1 \end{pmatrix}$$ [Equation 3]

Based on the position and the posture rotation matrix in the world coordinate system, an extrinsic matrix $M_0$ of the camera $C_0$ may be represented as: $M_0=[R_0\ T_0]$, and similarly, an extrinsic matrix $M_1$ of the mirror virtual camera $C_1$ may be represented as: $M_1=[R_1\ T_1]$.

An intrinsic matrix $I_0$ of the camera $C_0$ is only related to intrinsic parameters of the camera, and may be generally obtained according to factory parameters or calibration of the camera itself. In general, the intrinsic matrix $I_0$ may be represented as:

$$I_0 = \begin{pmatrix} f_x & 0 & s_x \\ 0 & f_y & s_y \\ 0 & 0 & 1 \end{pmatrix}$$ [Equation 4]

where $f_x$ and $f_y$ represent values related to a focal length of the camera $C_0$, and $s_x$ and $s_y$ represent values related to a principal point offset of the camera $C_0$ in the imaging.

Therefore, according to the mirror imaging principle, an intrinsic matrix $I_1$ of the mirror virtual camera $C_1$ may be represented as:

$$I_1 = \begin{pmatrix} -f_x & 0 & s_x \\ 0 & f_y & s_y \\ 0 & 0 & 1 \end{pmatrix}$$ [Equation 5]

Using the intrinsic and extrinsic matrices, a projection matrix $P_0$ of the camera $C_0$ may be represented as:

$$P_0 = M_0 \cdot I_0 = [R_0\ T_0] \cdot I_0$$ [Equation 6]

Similarly, a projection matrix $P_1$ of the mirror virtual camera $C_1$ may be represented as:

$$P_1 = M_1 \cdot I_1 = [R_1\ T_1] \cdot I_1$$ [Equation 7]

To simplify the description, in the above example, the camera $C_0$ is set at the origin position in the world coordinate system. It should be understood by those skilled in the art that, there are no particular limitations on the coordinate position of the camera $C_0$. Moreover, if there are a plurality of real cameras, they may be respectively distributed at any position including the origin.

Although the above Equations 1 to 7 only exemplarily describe the calculation method of the projection matrix for one plane mirror group $W_1$, a similar calculation method is also applicable to calculation of a projection matrix of another plane mirror group (such as $W_2$) in the case where a plurality of plane mirror groups are included.

Furthermore, although the specific example of determining the geometric association between the sampling point and the pixel point of the composite image using the projection matrix is described in detail herein, this disclosure is not limited thereto.

In step 506, a global feature corresponding to the sampling point is determined from the global feature map based on the geometric association.

As described above, the feature elements in the global feature map may correspond to the pixel points on the composite image, respectively. Furthermore, according to the processing in the step 504, the geometric association between the sampling point and the pixel point of the composite image may be determined. Therefore, based on the geometric association, the correspondence between the sampling point and the feature element may be determined.

It should be noted that, in addition to the body pixel points obtained by photographing the body of the target object, the composite image may include mirror image pixel points obtained by photographing the mirror image of the target object. Therefore, in some embodiments, the number of the global feature corresponding to each sampling point may be greater than 1, such that the total number of the global features may be greater than the number of the sampling points. Due to the limitation from the angle of view and influence of a possible splicing gap, not each sampling point may surely be photographed by each of the body camera and the mirror virtual camera, but the total number of the global features may still be much greater than that in the case of photographing the body of the target object using the camera only.

As illustrated in FIG. 4, encoding may be performed on imaging-related geometric information of the sampling point, to generate geometric encoded information (step 406).

In some embodiments, the imaging-related geometric information of the sampling point may include a spatial coordinate of the sampling point and at least part of interior and exterior orientation information of a camera imaging the sampling point. The camera not only includes the body camera, but also includes the mirror virtual camera defined in this disclosure.

For example, in some embodiments, the imaging-related geometric information of the sampling point may include only the spatial coordinate of the sampling point. In these embodiments, the generated geometric encoded information may be related only to the sampling point itself. Pixel points or corresponding global features corresponding to a same sampling point, regardless of whether obtained by the body camera or the mirror virtual camera, will be associated with same geometric encoded information.

For example, in some other embodiments, the imaging-related geometric information of the sampling point may include not only the spatial coordinate of the sampling point but also the interior and exterior orientation information of the camera. In these embodiments, pixel points or corresponding global features obtained by imaging a same sampling point from different angles of view by the body camera or the mirror virtual camera are associated with their respective different geometric coding information.

In some embodiments, the generated geometric encoded information may be a multi-dimensional vector. For example, as an example, the geometric encoded information may include multi-dimensional vectors corresponding to the spatial coordinate of the sampling point and the interior and exterior orientation information of the camera, respectively.

The inventors of the present application have realized that, the geometric encoded information contains, for example, information of the above various aspects, so that it can represent the geometric feature more accurately than intuitive geometric information. Therefore, representing the geometric feature using the geometric encoded information is beneficial for improving the accuracy of three-dimensional reconstruction.

As illustrated in FIG. 4, the global feature and the corresponding geometric encoded information may be inputted into a model, to determine a geometric relationship between the sampling point and a surface of the target object (step 408).

Specifically, for each sampling point, the global feature corresponding to the sampling point and the corresponding geometric encoded information may be inputted into the model.

As analyzed above, the use of the mirror, similar to the use of an additional camera, can enable the effect of achieving more angles of view. Therefore, in the case of introducing the mirror to provide the mirror virtual camera, the number of the global feature corresponding to each sampling point may be an integer greater than 1. In some embodiments, a plurality of global features corresponding to different angles of view and corresponding geometric coding information can be inputted for one sampling point, which advantageously improves the accuracy of the determination.

In addition, if the geometric encoded information can include the interior and exterior orientation information of the camera to reflect the angle of view for the imaging, it would also be advantageous to further improve the accuracy of the determination.

Those skilled in the art can appreciate that, any model capable of determining the geometric relationship between respective sampling point and the surface of the target object according to the above input may be adopted. Based on the global feature for any sampling point and the corresponding geometric encoded information, the model adopted may output a determination result indicating the geometric relationship between the sampling point and the surface of the target object.

In some embodiments, the determination result may be numerical. For example, in some embodiments, the determination result may be a numerical value indicating a probability that the sampling point is located inside/outside the surface of the target object. For example, when the determination result is 1, it can be indicated that the sampling point is located inside the surface of the target object. In contrast, when the determination result is 0, it can be indicated that the sampling point is located outside the surface of the target object, and vice versa. In other cases, the determination result can be between 0 and 1.

In some embodiments, the method for three-dimensional reconstruction may further include three-dimensionally reconstructing a voxel envelope of the target object based on the geometric relationship between the sampling point and the surface of the target object.

In some embodiments, by determining the geometric relationships between all the sampling points and the surface of the target object, the three-dimensionally reconstructed target voxel envelope can be obtained. For example, in the case where the determination result is a numerical value indicating the probability that the sampling point is located inside/outside the surface of the target object, by extracting an iso-surface of 0.5, the surface of the target object can be determined.

As illustrated in FIG. 4, in some embodiments, performing three-dimensional reconstruction further includes training the model (step 410).

In some embodiments, the model may be represented using an implicit function f that outputs the probability that the sampling point is located inside/outside the surface of the target object according to the above input. The description is made below by taking this case as an example, but those skilled in the art can appreciate that the present disclosure is not limited thereto.

First, a discrimination error of the model may be calculated according to the determination result of the step 408.

In some embodiments, the discrimination error may be obtained by comparing the determination result outputted by the model with a real surface of the target object.

For example, in some embodiments, the real surface of the target object may be described using an implicit function f*.

$$f^*(X) = \begin{cases} 1, & X \text{ is inside the surface} \\ 0, & \text{otherwise} \end{cases} \qquad \text{[Equation 8]}$$

That is, if the point X is inside the surface of the target object, the function value of f* is 1, and if it is outside the surface, the function value of f* is 0. The real surface of the target object may be an iso-surface with the function value of f* of 0.5.

Similarly, the implicit function f describing the model may be represented as follows.

$$f(X) = (F_{G1}(X), \dots, F_{Gm}(X), Z_1(X), \dots, Z_m(X)) \qquad \text{[Equation 9]}$$

where $F_{Gi}(X)$ and $Z_i(X)$ ($1 \leq i \leq m$) respectively refer to an i-th global feature in one or more global features corresponding to the sampling point X and corresponding geometric encoded information, and m represents the number of the global feature corresponding to the sampling point X, m being a positive integer not greater than (L+1). As described above, when the imaging-related geometric information of the sampling point that is indicated by the geometric encoded information includes only the spatial coordinate of the sampling point, $Z_i(X)$ may be the same.

Thus, in some embodiments, the discrimination error of the determination result may be calculated by calculating a difference between a function value of the implicit function f representing the model and the function value of the implicit function f* representing the real surface of the target object.

Subsequently, the model is iteratively optimized by, for example, updating parameters of the model, such that the discrimination error meets the precision requirement to complete the training of the model.

It should be appreciated by those skilled in the art that iterative optimization of the model may be performed by using any suitable method, including but not limited to gradient descent, random gradient descent, and the like.

The method for three-dimensional reconstruction according to the embodiment of the present disclosure can reduce the dependence on the number of cameras and enhance the adaptability to different application scenarios, and has low cost, high portability, extendibility and flexible adjustment capability, in addition, in the present application, an accurate and reliable information extraction and processing method is proposed, and the model is trained and used for the three-dimensional reconstruction of the target object based on the processed information. On this basis, the present disclosure can implement high-precision three-dimensional reconstruction on the target object using only a single camera or sparse cameras. The cost of the three-dimensional modeling can be reduced and/or the accuracy of the three-dimensional modeling can be improved.

It is noted that, the boundaries between the steps in the method described above are merely illustrative. In actual operations, the steps can be combined arbitrarily, and even combined into a single step. In addition, the execution order of the steps is not limited by the order described, and part of the steps may be omitted. The operational steps of the embodiments may also be combined with each other in any suitable order, thereby similarly implementing more or less operations than those described.

Figure 7:
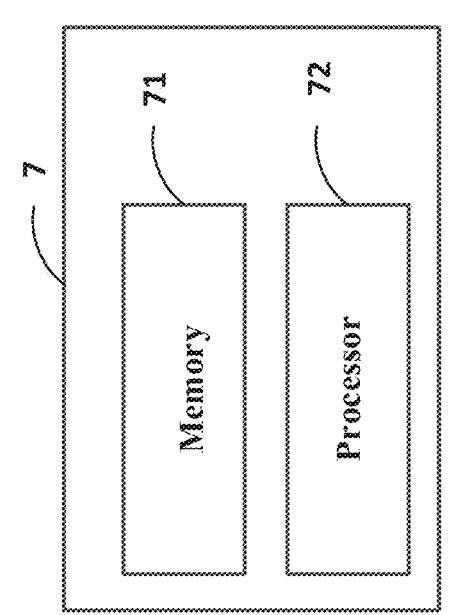
FIG. 7 is a block diagram illustrating an example of an electronic device according to an embodiment of the present disclosure.

FIG. 7 illustrates a block diagram of an electronic device according to some embodiments of the present disclosure.

As shown in FIG. 7, the electronic device 7 of this embodiment comprises: a memory 71 and a processor 72 coupled to the memory 71, the processor 72 being configured to perform, based on instructions stored in the memory 71, the method for three-dimensional reconstruction according to the embodiment of the present disclosure.

The memory 71 may include, for example, a system memory, a fixed non-volatile storage medium, and the like. The system memory has thereon stored, for example, an operating system, an application, a boot loader, a database, another program, and the like.

An embodiment of the present disclosure further provides a non-transitory computer-readable storage medium having one or more instructions stored thereon, which, when executed by a processor, may cause the processor to perform the method for three-dimensional reconstruction according to the embodiment of the present disclosure.

Specifically, the instructions in the computer-readable storage medium according to the embodiment of the present disclosure may be configured to perform operations corresponding to the above system and method embodiments. When referring to the above system and method embodiments, the embodiment of the computer-readable storage medium is apparent to those skilled in the art, and therefore, the description thereof is not repeated. The computer-readable storage medium for carrying or including the above instructions also falls within the scope of the present disclosure. Such computer-readable storage medium may include, but is not limited to, a floppy disk, an optical disc, a magneto-optical disc, a memory card, a memory stick, and the like.

Those skilled in the art should appreciate that, the present disclosure may take a form of an entire hardware embodiment, an entire software embodiment, or an embodiment combining software and hardware aspects. When implemented using software, the above embodiments may be implemented wholly or partially in a form of a computer program product. An embodiment of the present disclosure further provides a computer program product, comprising one or more computer instructions or computer programs, which, when executed by a processor, may cause the processor to perform the method for three-dimensional reconstruction according to the embodiment of the present disclosure. Specifically, the processes or functions according to the embodiments of the present application are generated wholly or partially when the computer instructions or computer programs are loaded or executed on a computer. The computer may be a general-purpose computer, a special-purpose computer, a computer network, or another programmable apparatus. Moreover, the present disclosure may take a form of a computer program product implemented on one or more computer-usable non-transitory storage media (including, but not limited to, a disk memory, a CD-ROM, an optical memory, and the like) having computer-usable program code embodied therein.

The embodiments of the present disclosure further provide various apparatuses including means or units for executing the steps of the method for three-dimensional reconstruction in the above embodiments.

It should be noted that the above means or units are merely logic modules divided according to the specific functions implemented by the means or units, and are not used for limiting the specific implementation, and they may be implemented in, for example, software, hardware or a combination of software and hardware. In actual implementations, the above means of units may be implemented as separate physical entities, or implemented by a single entity (e.g., a processor (CPU or DSP, etc.), an integrated circuit, etc.). For example, a plurality of functions included in one unit in the above embodiments may be implemented by separate means. Alternatively, a plurality of functions implemented by a plurality of units in the above embodiments may be implemented by separate means, respectively. In addition, one of the above functions may be implemented by a plurality of units.

The exemplary embodiments of the present disclosure are described above with reference to the drawings, but the present disclosure is of course not limited to the above examples. Those skilled in the art can obtain various changes and modifications within the scope of the attached claims, and should understand that these changes and modifications will naturally fall within the technical scope of the present disclosure.

Although the present disclosure and its advantages have been described in detail, it should be understood that various changes, substitutions and alterations can be made without departing from the spirit and scope of the present disclosure that are defined by the attached claims. Moreover, the terms "comprise", "include", or any other variation thereof in the embodiments of the present disclosure are intended to cover a non-exclusive inclusion, such that a process, method, article, or device that includes a list of elements not only includes those elements, but also includes other elements not expressly listed, or elements inherent to such a process, method, article, or device. Without more limitations, an element defined by a statement "including one . . . " does not exclude the presence of another identical element in a process, method, article, or device that includes the element.

The embodiment of the present disclosure further includes:

1. A method for three-dimensional reconstruction, comprising:

obtaining a composite image obtained by photographing a body of a target object and a mirror image of the target object; and performing three-dimensional reconstruction on the target object by using the composite image and relative position and posture information representing a position and posture of a mirror for generating the mirror image relative to a camera for the photography.

2. The method according to item 1, wherein the performing three-dimensional reconstruction comprises:

performing random sampling on points within a given three-dimensional space comprising the target object;

extracting a global feature corresponding to a sampling point from the composite image;

performing encoding on imaging-related geometric information of the sampling point, to generate geometric encoded information; and inputting the global feature and the geometric encoded information into a model, to determine a geometric relationship between the sampling point and a surface of the target object.

3. The method according to item 2, wherein the extracting the global feature corresponding to the sampling point from the composite image comprises:

performing feature extraction on the composite image, to obtain a global feature map;

determining a geometric association between the sampling point and a pixel point of the composite image; and determining the global feature corresponding to the sampling point from the global feature map based on the geometric association.

4. The method according to item 3, wherein the determining the geometric association between the sampling point and the pixel point of the composite image comprises:

determining a geometric association between the sampling point and a body pixel point in the composite image, which is obtained by photographing the body of the target object; and determining, according to the relative position and posture information, a geometric association between the sampling point and a mirror image pixel point in the composite image, which is obtained by photographing the mirror image of the target object.

5. The method according to item 1, further comprising:

calibrating at least one of the camera or the mirror, to obtain the relative position and posture information.

6. An electronic device, comprising:

a memory; and a processor coupled to the memory, the processor being configured to perform, based on instructions stored in the memory, the method for three-dimensional reconstruction according to any of items 1 to 5.

7. A non-transitory computer-readable storage medium having one or more instructions stored thereon, which, when executed by a processor, cause the processor to perform the method for three-dimensional reconstruction according to any of items 1 to 5.

8. A computer program product, comprising one or more instructions, which, when executed by a processor, cause the processor to perform the method for three-dimensional reconstruction according to any of items 1 to 5.

9. A system for three-dimensional reconstruction, comprising:

an information processing apparatus configured to perform the steps of the method according to any of items 1 to 5.

10. The system according to item 9, further comprising:

a plane mirror group providing the mirror.

11. The system according to item 10, wherein the plane mirror group is formed by plane mirror units.

12. The system according to item 10, wherein at least one of the number of the plane mirror groups, or a position or posture of at least part of the plane mirror groups relative to the camera is adjustable as needed.

13. The system according to item 10, wherein the plane mirror group comprises a position and posture obtaining module disposed thereon and configured to obtain and send information related to a position and posture of the plane mirror group.

14. A plane mirror group, comprising one or more plane mirror units, wherein:

the plane mirror group comprises a position and posture obtaining module disposed thereon and configured to obtain and send information related to a position and posture of the plane mirror group.

15. The plane mirror group according to item 14, wherein:

the plane mirror group is used for performing the method according to any of items 1 to 5, or is comprised in the system according to any of items 9 to 13.

What is claimed is:

1. A method for three-dimensional reconstruction, comprising:

obtaining a composite image obtained by photographing a body of a target object and a mirror image of the target object; and performing three-dimensional reconstruction on the target object by using the composite image and relative position and posture information representing a position and posture of a mirror for generating the mirror image relative to a camera for the photography, wherein the performing three-dimensional reconstruction comprises performing random sampling on points within a given three-dimensional space comprising the target object;

extracting a global feature corresponding to a sampling point from the composite image;

performing encoding on imaging-related geometric information of the sampling point, to generate geometric encoded information; and inputting the global feature and the geometric encoded information into a model, to determine a geometric relationship between the sampling point and a surface of the target object.

2. The method according to claim 1, wherein the extracting the global feature corresponding to the sampling point from the composite image comprises:

performing feature extraction on the composite image, to obtain a global feature map;

determining a geometric association between the sampling point and a pixel point of the composite image; and determining the global feature corresponding to the sampling point from the global feature map based on the geometric association.

3. The method according to claim 2, wherein the determining the geometric association between the sampling point and the pixel point of the composite image comprises:

determining a geometric association between the sampling point and a body pixel point in the composite image, which is obtained by photographing the body of the target object; and determining, according to the relative position and posture information, a geometric association between the sampling point and a mirror image pixel point in the composite image, which is obtained by photographing the mirror image of the target object.

4. The method according to claim 1, further comprising:

calibrating at least one of the camera or the mirror, to obtain the relative position and posture information.

5. A non-transitory computer-readable storage medium having one or more instructions stored thereon, which, when executed by a processor, cause the processor to perform the method for three-dimensional reconstruction according to claim 1.

6. A system for three-dimensional reconstruction, comprising:

an information processing apparatus comprising:

a memory; and a processor coupled to the memory, the processor being configured to perform, based on instructions stored in the memory, the steps of the method according to claim 1.

7. The system according to claim 6, further comprising:

a plane mirror group providing the mirror.

8. The system according to claim 7, wherein the plane mirror group is formed by plane mirror units.

9. The system according to claim 7, wherein at least one of the number of the plane mirror groups, or a position or posture of at least part of the plane mirror groups relative to the camera is adjustable as needed.

10. The system according to claim 7, wherein the plane mirror group comprises a position and posture obtaining module disposed thereon and configured to obtain and send information related to a position and posture of the plane mirror group.

11. An electronic device, comprising:

a memory; and a processor coupled to the memory, the processor being configured to perform, based on instructions stored in the memory, the steps of:

obtaining a composite image obtained by photographing a body of a target object and a mirror image of the target object; and performing three-dimensional reconstruction on the target object by using the composite image and relative position and posture information representing a position and posture of a mirror for generating the mirror image relative to a camera for the photography, wherein the performing three-dimensional reconstruction comprises performing random sampling on points within a given three-dimensional space comprising the target object;

extracting a global feature corresponding to a sampling point from the composite image;

performing encoding on imaging-related geometric information of the sampling point, to generate geometric encoded information; and inputting the global feature and the geometric encoded information into a model, to determine a geometric relationship between the sampling point and a surface of the target object.

* * * * *